Figure 1:
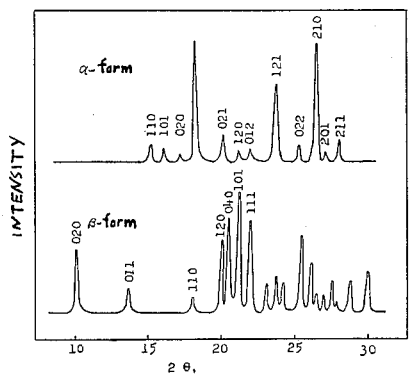
Figure 2:
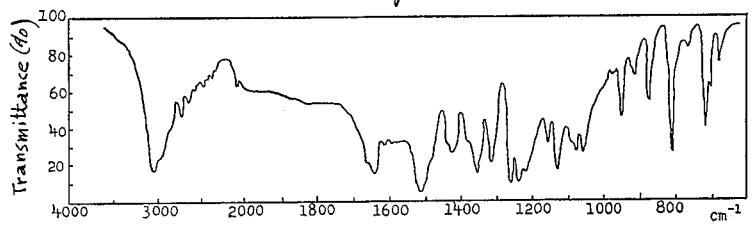
Figure 2:
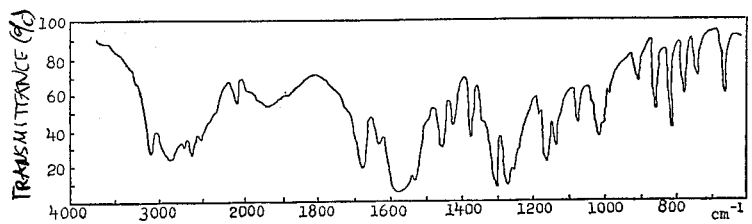

May 31, 1966 MINORU HARA ET AL 3,254,118

PROCESS FOR OPTICAL RESOLUTION OF RACEMIC GLUTAMIC ACID

Filed July 3, 1961

INVENTORS
MINORU HARA, NAOMASA
MIZOGUCHI, TADAO TAKENISHI,
BY KO OHNO, HIROSHI TAKAHASHI,
JIRO KATO, TOICHI YOSHIDA

AGENT 3,254,118
PROCESS FOR OPTICAL RESOLUTION OF RACEMIC GLUTAMIC ACID
Minoru Hara, Kawasaki, Naomasa Mizoguchi, Musashino, and Tadao Takenishi, Ko Ohno, and Hiroshi Takahashi, Tokyo, Jiro Kato, Yokkaichi, and Toichi Yoshida, Kamakura, Japan, assignors to Ajinomoto Co., Inc., Tokyo, Japan
Filed July 3, 1961, Ser. No. 121,624
Claims priority, application Japan, July 13, 1960, 35/30,952
1 Claim. (Cl. 260—534)

This invention relates to the optical resolution of racemic glutamic acid.

We have found that the resolution of racemic glutamic acid by the method of inoculating a super-saturated solution of racemic glutamic acid with seed crystals is improved by proper selection of the crystal forms of the seed crystals.

Optically active glutamic acid has two crystal forms: one is the granular prismlike orthorhombic α-form, of which the lattice constants are: $a=7.06$ A., $b=10.3$ A., $c=8.75$ A., as reported by J. D. Bernal (Z. Kryst., 78, 363 (1931)), the other is the needle-shaped or scaly orthorhombic β-form, of which the lattice constants are: $a=5.17$ A., $b=17.34$ A., $c=6.95$ A., as reported by S. Hirokawa (Acta Cryst., 8, 637 (1955)). We shall refer to these forms as α-form and β-form, respectively.

D- or L-glutamic acid is usually crystallized by cooling a saturated solution of the glutamic acid, by concentrating an aqueous solution of the glutamic acid under reduced pressure, or by adjusting the pH of an aqueous solution of sodium glutamate or glutamic acid hydrochloride to the isoelectric point of glutamic acid. The crystals of D- or L-glutamic acid prepared in this manner are almost always in the β-form. Even if the α-form is obtained partially during the crystallization process, it changes to the β-form. In order to obtain the α-form special procedures are necessary.

Characteristic properties of the two crystal forms of optically active glutamic acid as determined by us are graphically represented in the attached drawing.

FIG. I shows the X-ray diffraction patterns of the α- and β-forms of optically active glutamic acid. They are different, and the X-ray powder method may therefore be used for the quantitative analysis of the α- and β-form. Calibration curves permit the quantity of each type of crystals to be determined from diffraction intensities either at the face 111 for the α-form or at the face 101 for the β-form.

FIG. II shows infrared absorption spectra of the α- and β-forms. While the β-form has distinct absorption bands at 1663 cm.$^{-1}$ and 1640 cm.$^{-1}$ due to stretching vibration of $COO^-$ and beinding vibration of $NH_3^+$, respectively, the absorption band due to $COO^-$ vibration of the α-form shifts to 1683 cm.$^{-1}$. The α-form has an intense absorption band at 1585 cm.$^{-1}$ but the β-form has a very weak absorption in the same region. The absorption band at 1513 cm.$^{-1}$ due to the $NH_3^+$ vibration is intense for the β-form, but not observed for the α-form. The absorption band due to $CH_2$ vibration also appears only in the case of the α-form at 1353 cm.$^{-1}$. Further, bands at 100–1200 cm.$^{-1}$ due to $NH_3^+$ locking vibrations are very different with the two forms. The absorption band due to OH out-of-plane deformation vibration is observed at 807 cm.$^{-1}$ for the β-form, whereas it is at 820 cm.$^{-1}$ for the α-form.

The differences between the infrared spectra and the X-ray diffraction patterns show that the crystal structures of the α- and β-forms are quite different. We have also discovered that the α-form has a higher rate of crystal growth than the β-form, and that the α-form is better than the β-form with respect to yield and purity of L- or D-glutamic acid when used as seed crystals for the optical resolution of racemic glutamic acid. The stability of the resolution process and the purity of the products are improved by the use of the α-form as seed crystals. Such crystals are easily separated from the mother liquor owing to the favorable shape of the α-form.

Our invention is based on the aforedescribed discoveries and illustrated by the following examples.

Table I shows the results of experiments for resolving racemic glutamic acid under the conditions of Example 1 described hereinafter, except for the crystal form and the size of seed crystals.

TABLE I

| Experimental number | Crystal form of seed crystals | Size of seed crystals (mesh) | Amount of seed crystals (g.) | Operating time (min.) | Increment of optically active glutamic acid (g.) | Optical purity of the increment (percent) | Rate of growth of optically active glutamic acid |
|---|---|---|---|---|---|---|---|
| 1 | α | 80–100 | 2.9968 | 15 | 2.5640 | 99.1 | 5.70 |
| 2 | β | 80–100 | 2.9493 | 15 | 1.9714 | 85.6 | 5.46 |
| 3 | α | 100–150 | 3.0058 | 10 | 1.5041 | 95.1 | 5.00 |
| 4 | β | 100–150 | 2.9923 | 10 | 1.0755 | 85.8 | 3.59 |
| 5 | α | 150–200 | 3.0059 | 10 | 1.2029 | 96.3 | 4.00 |
| 6 | β | 150–200 | 3.0560 | 10 | 0.9716 | 88.3 | 3.18 |

In Table I, the term "rate of growth of optically active glutamic acid crystals" is defined to be the value $$\frac{\text{the increment of optically active glutamic acid}}{\text{amount of seed crystals} \times \text{operating time}} \times 100$$

It is evident from the growth rate values that the α-form has a higher rate of crystal growth than the β-form under the same conditions. It is one of the characteristics of this invention that the yield and optical purity of the products is greatly improved in a short operating time as shown in these experiments.

In a process for continuous resolution of racemic amino acids disclosed in the commonly assigned U.S. patent application Ser. No. 840,052, filed Sept. 15, 1959, and now abandoned, seed crystals of a desired enantiomorph are held in suspension in a resolution column by the upward flow of super-saturated racemate solution introduced from the bottom of the column. As seed crystals grow, they sink to the lower portion of the column, and are removed from the bottom while new seed crystals are supplied from the top of the column. Any fine crystals of the undesired antipode or the racemic substance which might form, are carried away by overflow with the solution at the top of the column so that the optical purity of the desired crystals is maintained. The overflowed solution is enriched with the racemic substance in an amount which corresponds to that consumed by the growth of the seeds, and is recycled to the resolution column.

In this process, the properties of the seed crystals and grown crystals which affect suspension in the column are important for stable operation.

When crystals rich in the α-form are used as seed crystals in this process, the grown crystals are large and approximately spherical or polyhedral. The crystal size decreases continuously in the column from the lower portion to the top of the column, while any fine crystals of the antipode or of racemic glutamic acid which might crystallize accompany the overflowing solution at the top of the column. The process is stable and the optical purity of the products is high.

If the seed crystals are rich in the β-form, either needle-shaped growth occurs on the surfaces of the seed crystals, or the surfaces of the seed crystals become uneven on growing. Sometimes, grown seed crystals form plates.

In any case, the resistance of the crystals to the upward flow of the solution in the column is relatively high. The crystals therefore are not distributed in the column according to size, and the desired grown crystals accompany the overflowing solution at the top of the column together with the fine crystals of racemic glutamic acid or antipode crystals. Continuous operation of this process is impractical.

Even if the process could be operated continuously, the optical purity of the products would be lower than with α-form seed crystals. The rate of crystal growth of the β-form is low and a larger quantity of the mother liquor contaminates the crystalline product separated from the solution owing to the unevenness of the crystal surface.

Table II shows the results of experiments on the resolution of racemic glutamic acid under the conditions of Example 2 described hereinafter, except for the α-form content of the seed crystals. The tabulated α-form content does not indicate a percentage of pure α-form crystals mixed with pure β-form crystals, but indicates the percentage of α-form in an individual crystal, the remainder being β-form.

TABLE II

| The α-form content of seed crystals (percent) | Grown crystal (weight) / Seed crystal (weight) | Optical purity of grown crystals (percent) | Operating stability |
| --- | --- | --- | --- |
| 75 | 10 | 97.4 | Capable of continuous operation. |
| 30 | 10 | 93.6 | Unable to operate more than one day. |

Table III shows the results of experiments on the resolution of racemic glutamic acid with seed crystals having various α-form contents. The experiments were performed as described hereinafter in Example 3.

TABLE III

| The α-form content of seed crystal (percent) | Grown crystal (weight) / Seed crystal (weight) | Optical purity of grown crystals (percent) |
| --- | --- | --- |
| 85 | 4 | 97.3 |
| 45 | 4 | 96.9 |
| 35 | 4 | 96.9 |
| 12 | 4 | 82.0 |
| 10 | 4 | 74.5 |

The word "crystal" or "crystals" in Tables II and III refers to L-glutamic acid, but the results obtained with D-glutamic acid were almost the same as those shown in said tables.

In view of the results tabulated above, it is evidently preferable to use optically active glutamic acid rich in the α-form as seed crystals for the resolution of racemic glutamic acid by the method of inoculating a super-saturated solution of racemic glutamic acid with such seed crystals.

For industrial production of optically active glutamic acid having an optical purity of more than about 90%, it is preferred to use optically active glutamic acid seed crystals which contain more than 30% of the α-form.

This invention is illustrated by the following examples. But it is to be understood that these examples are illustrative only, and are not intended to limit the scope of this invention.

*Example 1*

A hot aqueous solution was prepared to contain 7% of racemic glutamic acid, 15% racemic monosodium glutamate and 1% L-glutamic acid. A vessel containing 100 ml. of such solution was immersed in a thermostatic bath at 55° C. 2.9968 grams α-form crystals of L-glutamic acid having a size of 80 to 100 mesh were added as seed crystals to the solution at 55° C., and the resulting mixture was stirred for 15 minutes. The grown crystals were separated from the mother liquor by filtration, washed with water and dried to give 5.5831 grams of grown crystals having an optical purity of 99.6%.

Another experiment was carried out in the same way, but 2.9493 grams of β-form L-glutamic acid were used as seed crystals to give 5.2516 grams of grown crystals having an optical purity of 93.7%.

When the weight of the seed crystals is subtracted from that of the product it is found that the material crystallized weighed 2.5863 grams at an optical purity of 99.1% in the case of the α-form seed crystals, and 2.3023 grams of 85.6% purity in the case of the β-form seed crystals. Of the newly crystallized L-glutamic acid, 0.9% in the case of the α-form and 14.4% in the case of the β-form were obviously present as racemic glutamic acid. The net amounts of L-glutamic acid grown were therefore 2.5640 grams in the case of the α-form and 1.9714 grams in the case of the β-form seed crystals. Thus, the weights of newly crystallized L-glutamic acid per unit time (minute) and per unit weight (gram) of seed crystals were 0.0570 gram for the α-form and 0.0446 gram for the β-form respectively.

The differences between the α-form and the β-form with respect to the rate of crystal growth and hence with respect to the optical purity and the yield of grown crystals are such that it is highly beneficial to use the α-form as seed crystals for the resolution of racemic glutamic acid.

*Example 2*

An aqueous solution saturated with racemic glutamic acid at 65° C. at pH 4.5 was prepared from racemic glutamic acid, sodium hydroxide and water. It was stored in a tank at 70° C. The solution was cooled by passage through a cooling tube. The resulting super-saturated solution of glutamic acid at 55° C. was introduced at a rate of 3 l./min. to the bottoms of a pair of resolution columns, each 50 mm. in diameter and 600 mm. high.

Two hundred grams of seed crystals of D- and L-glutamic acid having a size of 16–24 mesh, and respectively containing 83% and 88% of the α-form were suspended in respective columns by the upward flow of the super-saturated solution.

Grown crystals were removed from the bottom at the rate of 70 grams each of D- and L-glutamic acid per hour, while fresh seed crystals were supplied to the top of the columns at the rate of 6 grams each of D- and L-glutamic acid per hour.

The overflowing solution containing fine crystals of racemic glutamic acid was mixed with an amount of racemic glutamic acid corresponding to that consumed by the growth of seed crystals, to saturate the solution with racemic glutamic acid at pH 4.5 at 65° C. Thus the solution was recycled repeatedly.

Within 60 hours 4382 grams of L-glutamic acid and 4399 grams of D-glutamic acid were obtained. Their mean optical purities were both 96.8%. The resolution process was operated under stable conditions during this period without any difficulty.

Another experiment was performed under the same conditions and in the same equipment with seed crystals containing 27% of the α-form.

Some of the suspended crystals in the column gradually grew needle-shaped crystals on their surfaces in the course of this experiment and these irregular crystals remained at the top of the columns instead of going to the bottoms on growing. After twenty two hours the experiment could not be continued further, because the irregular crystals became entangled with one another and finally form a stiff mass in the resolution column. Only 1697 grams of L-glutamic acid and 1654 grams of D-glutamic acid were obtained.

The optical purity of the grown crystals gradually deteriorated, and the mean optical purities of the grown crystals were 88.6% for L-glutamic acid and 90.2% for D-glutamic acid.

*Example 3*

An aqueous solution saturated with racemic glutamic acid at 60° C. at pH 4.3 was prepared by adding racemic glutamic acid and sodium hydroxide to water, and was stored in a tank at 70° C. After the solution was cooled by passage through a cooling tube to give a super-saturated solution of glutamic acid at 55° C. it was introduced at a flow rate of 2 l./min. to a pair of resolution tanks connected in parallel having a capacity of 6 l., and each equipped with a mechanical stirrer. 500 grams seed crystals of D- and L-glutamic acid respectively, having a size of 30–35 mesh, and containing 45% of the α-form, were suspended in each tank. The solutions overflowing from the tanks were combined, and the resulting mixed solution was recycled after replenishment with racemic glutamic acid as described in Example 2. After 7 hours, the grown crystals of D- and L-glutamic acid were separated by centrifugation from the respective mother liquors to give 1.85 kg. of D-glutamic acid and 1.82 kg. of L-glutamic acid. The optical purities of these crystals were 97.1% for the D-glutamic acid and 96.9% for the L-glutamic acid.

The optical purities of the L-glutamic acid (1.83 kg.) and the D-glutamic acid (1.99 kg.) were 74.5% and 82.0%, respectively, when the experiment was repeated under the same conditions in the same equipment with seed crystals of D- and L-glutamic acid which contained only 10% and 12% of the α-form, respectively.

What we claim is:

In a process for the optical resolution of racemic glutamic acid by inoculating a super-saturated solution of racemic glutamic acid with seed crystals of optically active glutamic acid, and permitting optically active glutamic acid to crystallize on said seed crystals, the improvement which consists of using crystals of optically active glutamic acid containing more than 30 percent of the orthorhombic α-form as seed crystals, said α-form having lattice constants of $a=7.06$ Angstrom units, $b=10.3$ Angstrom units, and $c=8.75$ Angstrom units.

References Cited by the Examiner

UNITED STATES PATENTS 2,683,739   7/1954   Weidman.
2,987,543   6/1961   Purvis.

LORRAINE A. WEINBERGER, *Primary Examiner.*

LEON ZITVER, *Examiner.*

D. P. CLARKE, A. P. HALLUIN, *Assistant Examiners.*